BEST AVAILABLE COPY

DEFENSIVE PUBLICATION T856,002

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 5, 1968

856 O.G. 3

668,265

CATALYST AND CATALYTIC PROCESS FOR PREPARING UNSATURATED ALIPHATIC ALDEHYDES AND MONOCARBOXYLIC ACIDS FROM OLEFINS

Howard S. Young and Edgar L. McDaniel, Kingsport, Tenn., assignors to Eastman Kodak Company, Rochester, N.Y., a corporation of New Jersey

Original application June 15, 1964, Ser. No. 375,284. Divided and this application July 21, 1967. Published Nov. 5, 1968

Class 252—456

No Drawing. 3 Pages Specification

A catalyst comprising a calcined mixture of an oxide of arsenic and a heteropoly acid of molybdenum containing manganese as the central atom, or salts of said heteropoly acids, on a carrier. The carrier is preferably silica. The catalysts are useful in the production of acrolein, methacrolein, acrylic acid and methacrylic acid by oxidizing propylene or isobutylene.